(12) United States Patent
Choi et al.

(10) Patent No.: US 10,769,309 B2
(45) Date of Patent: *Sep. 8, 2020

(54) APPARATUS AND METHOD FOR GENERATING IDENTIFICATION KEY

(71) Applicant: ICTK Holdings Co., Ltd., Seongnam-si (KR)

(72) Inventors: Byong Deok Choi, Seoul (KR); Dong Kyue Kim, Seoul (KR); Tae Wook Kim, Seoul (KR)

(73) Assignee: ICTK HOLDINGS CO., LTD, Seoul (KR)

( * ) Notice: Subject to any disclaimer, the term of this patent is extended or adjusted under 35 U.S.C. 154(b) by 30 days.

This patent is subject to a terminal disclaimer.

(21) Appl. No.: 16/266,168

(22) Filed: Feb. 4, 2019

(65) Prior Publication Data
US 2019/0171850 A1 Jun. 6, 2019

Related U.S. Application Data

(63) Continuation of application No. 15/015,985, filed on Feb. 4, 2016, now Pat. No. 10,235,540, which is a
(Continued)

(30) Foreign Application Priority Data

Dec. 9, 2010 (KR) .................. 10-2010-0125633

(51) Int. Cl.
*G06F 21/73* (2013.01)
*G06F 21/70* (2013.01)
(Continued)

(52) U.S. Cl.
CPC .............. *G06F 21/73* (2013.01); *G06F 21/70* (2013.01); *G06F 21/86* (2013.01); *H04L 9/0861* (2013.01);
(Continued)

(58) Field of Classification Search
None
See application file for complete search history.

(56) References Cited

U.S. PATENT DOCUMENTS 5,802,592 A 9/1998 Chess et al.
6,047,068 A 4/2000 Rhelimi et al.
(Continued)

FOREIGN PATENT DOCUMENTS

EP 2 230 794 A2 9/2010
JP 09-293040 A 11/1997
(Continued)

OTHER PUBLICATIONS

Extended European Search Report for Application No. EP 11847167.1 (PCT/KR2011000605) dated Mar. 23, 2017 (7 pages).
(Continued)

*Primary Examiner* — Benjamin E Lanier
(74) *Attorney, Agent, or Firm* — Finnegan, Henderson, Farabow, Garrett & Dunner, LLP (57) ABSTRACT

Provided is an apparatus for generating an identification key by a probabilistic determination of a short occurring between nodes constituting a circuit, by violating a design rule provided during a semiconductor manufacturing process. The identification key generating apparatus may include an identification key generator to generate an identification key based on whether a contact or a via used to electrically connect conductive layers in a semiconductor chip shorts the conductive layers, and an identification key reader to read the identification key by reading whether the contact or the via shorts the conductive layers.

20 Claims, 8 Drawing Sheets

Related U.S. Application Data continuation of application No. 13/806,628, filed as application No. PCT/KR2011/000605 on Jan. 28, 2011, now Pat. No. 9,292,710.

(51) Int. Cl.
  *G06F 21/86* (2013.01)
  *H04L 9/08* (2006.01)
  *G06F 7/58* (2006.01)
  *G09C 1/00* (2006.01)

(52) U.S. Cl.
  CPC ............... *G06F 7/588* (2013.01); *G09C 1/00* (2013.01); *H04L 9/0866* (2013.01)

(56) References Cited

U.S. PATENT DOCUMENTS

| | | |
|---|---|---|
| 6,118,279 A | 9/2000 | Field et al. |
| 6,275,062 B1 | 8/2001 | Starr |
| 6,941,536 B2 | 9/2005 | Muranaka |
| 7,282,377 B2 | 10/2007 | Muranaka |
| 7,665,049 B2 | 2/2010 | Muranaka |
| 2003/0108204 A1 | 6/2003 | Audebert et al. |
| 2004/0053429 A1 | 3/2004 | Muranaka |
| 2005/0263605 A1 | 12/2005 | Muranaka |
| 2006/0131575 A1 | 6/2006 | Okuno |
| 2008/0028349 A1 | 1/2008 | Muranaka |
| 2009/0189744 A1 | 7/2009 | Wang et al. |
| 2010/0031065 A1 | 2/2010 | Futa et al. |
| 2010/0070777 A1 | 3/2010 | Salters et al. |
| 2011/0080715 A1 | 4/2011 | Chiao-Li |
| 2011/0087897 A1 | 4/2011 | Nelson et al. |

FOREIGN PATENT DOCUMENTS

| | | |
|---|---|---|
| JP | 2004-511082 | 4/2004 |
| JP | 2006-173485 | 6/2006 |
| TW | 201438449 | 10/2014 |
| WO | WO 01/73841 A2 | 10/2001 |
| WO | WO 02-50910 A1 | 6/2002 |
| WO | WO 2008-056612 | 5/2008 |
| WO | WO 2010-123185 A1 | 10/2010 |

OTHER PUBLICATIONS

International Search Report, dated Jan. 13, 2012, in International Application No. PCT/KR2011/000605.

APPARATUS AND METHOD FOR GENERATING IDENTIFICATION KEY

CROSS-REFERENCE TO RELATED APPLICATIONS

This is a continuation of U.S. application Ser. No. 15/015,985, filed Feb. 4, 2016 (now allowed), which is a continuation of U.S. application Ser. No. 13/806,628, filed Dec. 21, 2012 (now U.S. Pat. No. 9,292,710), which is a national phase application based on PCT/KR2011/000605, filed on Jan. 28, 2011, which claims the benefit of priority to Korean Patent Application No. 10-2010-0125633, filed on Dec. 9, 2010, the contents of all of which are incorporated herein by reference in their entirety.

BACKGROUND

1. Field of the Invention

Exemplary embodiments relate to a digital security field, and more particularly, to an apparatus and a method for generating an identification key used for an encoding and decoding method, a digital signature, and the like that may be necessary for security of an electronic apparatus, embedded system security, system on chip (SoC) security, smart card security, universal subscriber identity module (USIM) security, and the like.

2. Description of the Related Art

As an information-oriented society has been advanced, the necessity for protection of individual privacy has increased. Thus, a technology for building a security system that may transmit information securely using encryption and decryption of the information is an essentially required and salient technology.

In the advanced information-oriented society, along with a high performance computer, the use of a computing device in a form of an embedded system or a system on chip (SoC) has rapidly increased. For example, the computing devices such as radio-frequency identification (RFID), a smart card, a universal subscriber identity module (USIM), a one-time password (OTP), and the like have been widely used.

In order to build a security system in the computing device, a cryptographic-key that is used for encryption and decryption algorithms, or a unique identification may be used. The cryptographic-key or the unique identification will be hereinafter referred to as an identification key. The identification key is mainly dependent on a method of externally generating a pseudo random number (PRN) that may be cryptographically secure, and storing the PRN in a non-volatile memory such as a flash memory, an electrically erasable programmable read-only memory (EEPROM), and the like.

With respect to an identification key stored in a computing device, various attacks such as a side channel attack, a reverse engineering attack, and the like have been recently carried out. In response to these attacks, Physical Unclonable Function (PUF) technology is being developed as a method of securely generating and storing an identification key.

The PUF is a technology for generating an identification key using subtle physical characteristic differences that exist in an electronic system, and maintaining or storing the identification key as generated, which is also referred to as a hardware fingerprint.

In order to use the PUF as an identification key, first, randomness of a generated identification key should be sufficient, and second, a value of the generated identification key should be invariant with respect to time flow or changes in the environment of use.

However, there exist problems with the conventional technologies, such as sufficient randomness being difficult to obtain, and a generated identification key being modified due to changes in physical characteristics according to time flow or due to changes in environment of use, that have yet to be resolved.

SUMMARY

In one general aspect there is provided an apparatus and a method for generating an identification key for the purpose of generating a random number value through a semiconductor manufacturing process, then developing a Physical Unclonable Function (PUF) technology providing the value that, once generated, may be time-invariant, and using the PUF technology as an identification key.

An aspect of the present invention also provides an apparatus and a method for generating an identification key that may probabilistically guarantee a balancing between a digital value of 0 and a digital value of 1 in an identification key in a form of a digital value.

An aspect of the present invention also provides an apparatus and a method for generating an identification key to configure a PUF which may be manufactured at a relatively low cost and in a simple manner, may be physically unclonable and, accordingly, may be impervious to an external attack.

According to an aspect, there is provided an apparatus for generating an identification key by a probabilistic determination of whether a short occurs between nodes constituting a circuit by violating a design rule provided during a semiconductor manufacturing process.

According to an aspect, there is provided an apparatus for generating an identification key including an identification key generator to generate an identification key based on whether a contact or a via, used to electrically connect conductive layers in a semiconductor chip, shorts the conductive layers, and an identification key reader to read the identification key by reading whether the contact or the via shorts the conductive layers.

The identification key generator may include a circuit including a contact or a via that may be designed to be equal to or smaller than a size determined by the design rule provided during the semiconductor manufacturing process. The contact or the via that is designed to be diminutive may probabilistically determine a short between the conductive layers.

After determination of whether the contact or the via shorts the conductive layers is established, a value of a determined result having an invariant characteristic according to time flow and environment of use may be generated once and may remain unchanged.

The identification key generator may set a size of the contact or a size of the via so that a probability that the contact or the via shorts the conductive layers, and a probability that the contact or the via fails to short the conductive layers, may be equal. Here, a probability that a digital value generated by the identification key generator corresponding to 0, and a probability that a digital value generated by the identification key generator corresponding to 1 may equally correspond to ½, wherein a probability of ½ is equivalent to 50% hereinafter.

The identification key generator may include a circuit to generate a 1-bit digital value using a single contact or a single via connecting a single pair of the conductive layers, and may generate an N-bit identification key using N circuits.

When a probability that a digital value constituting the N-bit identification key generated by the identification key generator corresponds to 0 and a probability that a digital value constituting the N-bit identification key generated by the identification key generator corresponds to 1 are not close to ½, randomness of the generated identification key may decrease.

According to an aspect of the present invention, an identification key processing unit to process the identification key in order to secure the randomness of the generated identification key may be further included.

The apparatus for generating the identification key may include the identification key processing unit to process the identification key by receiving an input of an identification key read by the identification key reader, by grouping digital values constituting the identification key based on k bits and generating a plurality of digital value groups, by comparing a first group and a second group among the plurality of the digital value groups, and by determining a digital value to be 1 when a value including k digital bits included in the first group is greater than a value including k digital bits included in the second group, the digital value representing the first group and the second group.

Ideally, when the probability of 0 being generated and the probability of 1 being generated correspond exactly to ½, the randomness of the generated identification key may be secured to the maximum. The probability of generating a 0 and the probability of generating a 1, however, may not correspond exactly to ½. Nevertheless, when two groups are compared by being grouped based on k bits, although the probability that 0 is generated and the probability that 1 is generated may not correspond exactly to ½, the two groups may be under an equal condition and, accordingly, a probability that the first group has a greater value than the second group and a probability that the first group has a lower value than the second group may become equal.

The first group and the second group may have an equal value and, in this instance, a digital value representing the first group and the second group either may be determined to be one of 1 or 0, or may not be determined. Thus, even when in the apparatus for generating the identification key, the probability that 0 is generated and the probability that 1 is generated may not correspond exactly to ½, the probability that 0 is generated and the probability that 1 is generated may become equal through the identification processing unit, and thereby randomness may be secured.

In order to generate an M-bit identification key at the apparatus of generating the identification key including the identification key processing unit, when a grouping is performed based on k bits, M×k bits may need to be generated. However, when values of the first group and the second group are equal, a representative value may not be determined at times, and thus a circuit may be configured to generate a more sufficient number of bits than the M×k bits.

According to an aspect of the present invention, there is provided an apparatus for generating an identification key, the apparatus including an identification key generator having a spacing between conductive layers of a semiconductor, the identification key generator to generate an identification key based on whether a short occurs between the conductive layers of the semiconductor, and an identification key reader to read the identification key by reading whether a short occurs between the conductive layers.

According to an aspect of the present invention, there is provided an apparatus for generating an identification key, the apparatus including an identification key generator having a spacing between conductive layers of a semiconductor, the identification key generator to generate an identification key based on whether a short occurs between the conductive layers of the semiconductor, and an identification key reader to read the identification key by reading whether a short occurs between the conductive layers, wherein the spacing between the conductive layers of the semiconductor may be set to a size violating a design rule provided during a semiconductor manufacturing process.

The identification key generator may have the spacing between the conductive layers of the semiconductor so that a difference between a probability of a short occurring between the conductive layers of the semiconductor and a probability of a short failing to occur between the conductive layers of the semiconductor may fall within a predetermined error range.

According to an aspect of the present invention, there is also provided a method of generating an identification key, the method including generating an identification key by a probabilistic determination of whether a short occurs between nodes constituting a circuit by violating a design rule provided during a semiconductor manufacturing process, and reading the identification key by reading whether a short occurs between the nodes constituting the circuit.

According to an aspect of the present invention, there is also provided a method of generating an identification key, the method including generating the identification key having a spacing between conductive layers of a semiconductor, and based on whether a short occurs between the conductive layers of the semiconductor, and reading the identification key by reading whether a short occurs between the conductive layers, wherein the spacing between the conductive layers of the semiconductor is set to a size violating a design rule provided during a semiconductor manufacturing process.

Effect of the Invention

According to exemplary embodiments, provided are an apparatus and a method for generating an identification key which may be highly reliable since the identification key may be randomly generated through a semiconductor manufacturing process, and a value of the identification key may be invariant once generated.

According to exemplary embodiments, provided are an apparatus and a method for generating an identification key which may probabilistically guarantee a balancing between a digital value of 0 and a digital value of 1 in an identification key in a form of a digital value, and thereby randomness may be secured.

According to exemplary embodiments, provided are an apparatus and a method for generating an identification key which may be manufactured at a relatively low cost and in a simple manner, may be physically unclonable and, accordingly, may be impervious to an external attack.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present disclosure, examples of which are illustrated in the accompanying drawings, wherein like reference numerals refer to the like elements throughout. Exemplary embodiments are described below to explain the present invention by referring to the figures.

Figure 1:
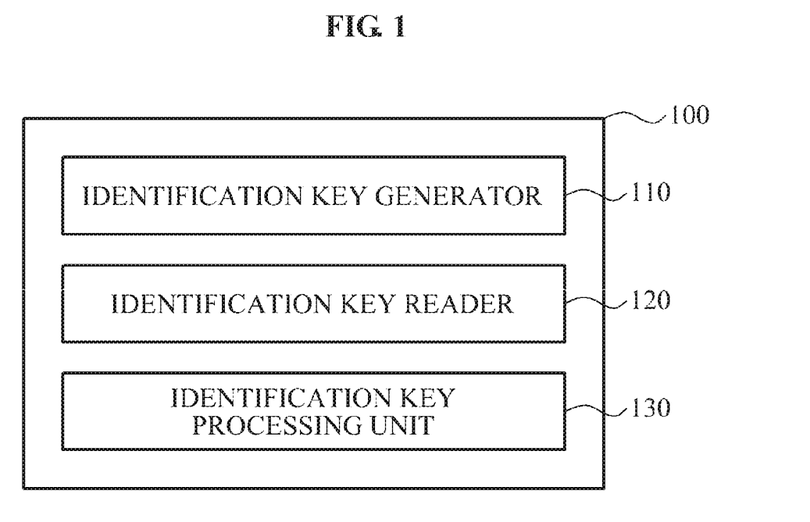
FIG. 1 is a diagram illustrating an apparatus for generating an identification key according to an exemplary embodiment.

FIG. 1 is a diagram illustrating an apparatus 100 for generating an identification key according to an exemplary embodiment.

An identification key generator 110 may generate, through a semiconductor process, an identification key that may be invariant to time flow and, although the generated identification key may be random, it may be invariant to time flow.

The identification key generated by the identification key generator 110 may correspond to, for example, an N-bit digital value, N being a natural number.

Factors in reliability of an identification key to be generated may include randomness of the generated identification key and invariance of the identification key that may be invariant to time flow.

The identification key generator 110 may be configured to have randomness depending on whether a short occurs between nodes generated in a semiconductor manufacturing process. In addition, whether the short occurs between the nodes may be invariant to time flow and environment of use and, accordingly, the identification key may be invariant once generated.

The identification key generator 110 may generate an identification key based on whether conductive layers, for example, metal layers, are shorted by a contact or a via that may be formed between the conductive layers generated during a semiconductor manufacturing process.

The contact or the via may be designed to connect the conductive layers, and a size of the contact or a size of the via may be commonly determined to short the conductive layers. A common design rule may determine a minimum size of the contact or the via to guarantee a short between the conductive layers.

However, in the configuration of the identification key generator 110 according to an exemplary embodiment, the size of the contact or the size of the via may be determined to be smaller than a size determined by the design rule, and thereby a part of the contacts or a part of the vias may short the conductive layers, and the other part of the contacts or the other part of the vias may not short the conductive layers. Here, whether the short occurs may be probabilistically determined.

In a conventional semiconductor process, when a contact or a via fails to short conductive layers, although the process may be considered to have failed, it may be used for generating an identification key having randomness.

Setting of the size of the contact or the size of the via according to the above-described embodiment will be further described with reference to FIG. 2 and FIG. 3.

According to another embodiment of the present invention, the identification key generator 110 may generate an identification key having randomness by a probabilistic determination of whether a short occurs between conductive lines, by determining a spacing between the conductive lines to be less than a size determined by a design rule, during a semiconductor manufacturing process.

The above-described embodiment may be used to generate a random identification key by violating design rules, which may guarantee an opening between the conductive lines, that is, a spacing greater than a predetermined level, during a conventional semiconductor manufacturing process.

Setting of the spacing between the conductive lines will be further described with reference to FIG. 4.

The identification key generator 110 may electrically generate the generated identification key according to the above-described embodiment of the present invention. Whether a contact or a via shorts conductive layers or a short occurs between conductive lines may be identified using a read transistor, a configuration of which will be further described with reference to FIG. 6.

In an embodiment using a size adjustment of the contact or the via, even when a ratio of the contact or the via that shorts the conductive layers by adjusting a size of the contact or the via and a ratio of the contact or the via that fails to short the conductive layers may be adjusted to have an equal probability corresponding to ½, it may be possible that an exactly equal ratio between the case that the short occurs (for example, a digital value of 0) and the opposite case (for example, a digital value of 1) may not be probabilistically guaranteed.

That is, as the size of the contact or the via becomes closer to a value determined by a design rule, a probability of a short occurring may become greater, and conversely, as the size of the contact or the via becomes smaller than the value determined by the design rule, a probability of a short failing to occur may become greater. When one of the probabilities of the short occurring and the probability of the short failing to occur becomes greater, randomness of a generated identification key may decrease.

The same issue may arise in an exemplary embodiment of adjusting of the spacing between the conductive lines as above-described.

Thus, the apparatus 100 for generating the identification key may further include an identification key processing unit 130 to process the identification key generated by the identification key generator 110, which may increase or guarantee randomness. Although the term identification key processing unit may be used to refer to reference numeral 130 in this disclosure, the present disclosure is not limited to this specific exemplary embodiment.

An operation of the identification key processing unit 130 will be further described with reference to FIG. 7.

Figure 2:
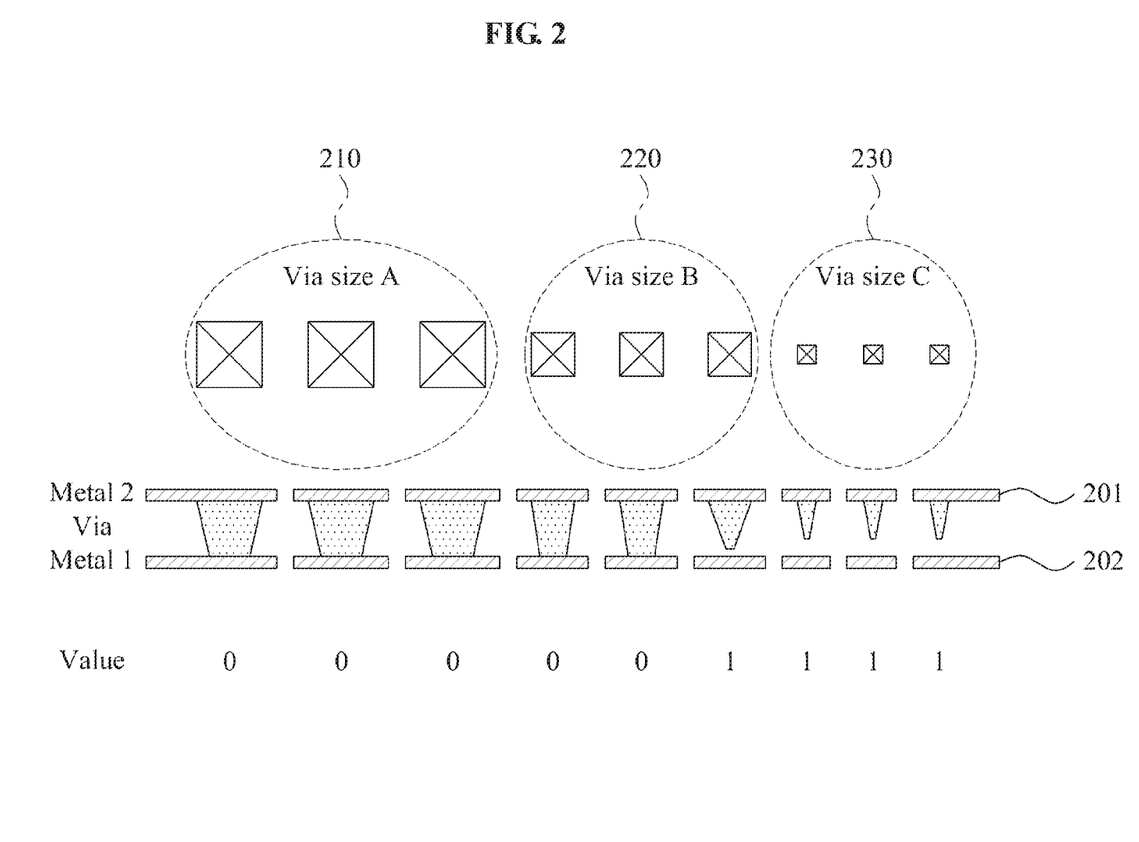
FIG. 2 is a diagram describing a configuration of an identification key generator according to an exemplary embodiment.

FIG. 2 is a diagram describing a configuration of an identification key generator according to an exemplary embodiment.

In FIG. 2, a configuration of vias that may be formed between a metal 1 layer 202 and a metal 2 layer 201 during a semiconductor manufacturing process is illustrated.

In a group 210 here vias may be set to a sufficient size as determined by a design rule, all of the vias may short the metal 1 layer 202 and the metal 2 layer 201, and whether a short occurs may be indicated as a digital value of 0.

In a group 230 where vias may be set to a small size, all of the vias may not short the metal 1 layer 202 and the metal 2 layer 201. Here, whether a short occurs may be indicated by a digital value of 1.

In a group 220 where vias are set to a medium size between the size of the group 210 and the size of the group 230, part of the vias may short the metal 1 layer 202 and the metal 2 layer 201, and the other part of the vias may not short the metal 1 layer 202 and the metal 2 layer 201.

Similar to the group 220, the identification key generator 110 may be configured by setting a size of vias so that part of the vias may short the metal 1 layer 202 and the metal 2 layer 201, and the other part of the vias may not short the metal 1 layer 202 and the metal 2 layer 201.

A design rule with respect to a size of a via may be different depending on a semiconductor manufacturing process. For example, when a design rule of a via is set to 0.25 μm during a complementary metal-oxide-semiconductor (CMOS) process of 0.18 μm, the identification key generator 110 may set a size of a via as 0.19 μm, and thereby enabling a probabilistic distribution of whether a short occurs between metal layers.

An ideal probability of a short occurring with respect to the probability distribution of whether the short occurs may correspond to a probability of 50%. The identification key generator 110 may be configured by setting a size of a via to correspond to the ideal probability distribution or as close as possible to the probability distribution of 50%. In certain embodiments, the size of the via may be determined in accordance with a process-based experiment.

Figure 3:
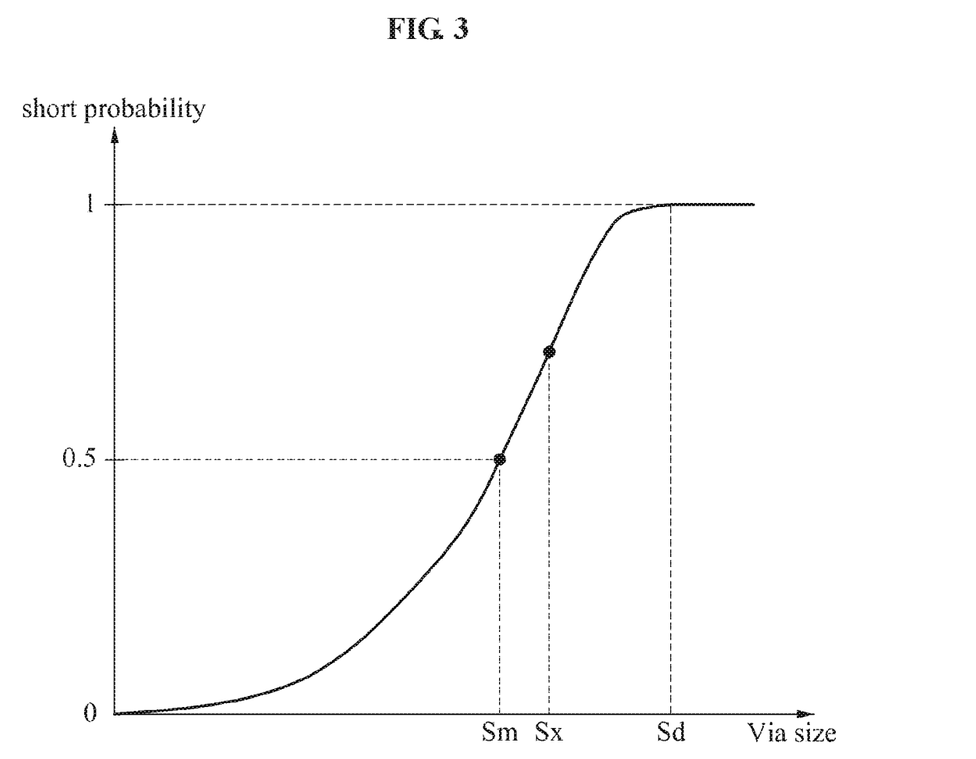
FIG. 3 is a graph describing a configuration of an identification key generator according to an exemplary embodiment.

FIG. 3 is a graph describing a configuration of an identification key generator according to an exemplary embodiment.

As confirmed in the graph, as a size of a via becomes greater, a probability that a short occurs between metal layers may be close to 1. A size of a via determined by a design rule may correspond to Sd which may be a value to sufficiently guarantee a short between the metal layers.

Sm may be a size of a via at which a probability of whether a short occurs between the metal layers may theoretically correspond to 0.5. Sm may have a different value based on a process, and in certain embodiments, an approximate value, although not exact, may be found in accordance with a process-based experiment.

In the identification key generator 110, whether a short occurs between the metal layers may be set to 0.5, within a range of Sx1 (not shown) and Sx2 (not shown) that may have a predetermined allowable error. Here. Sx1 and Sx2 may be near to the shown Sx, and may correspond to a size having a predetermined margin.

Figure 4:
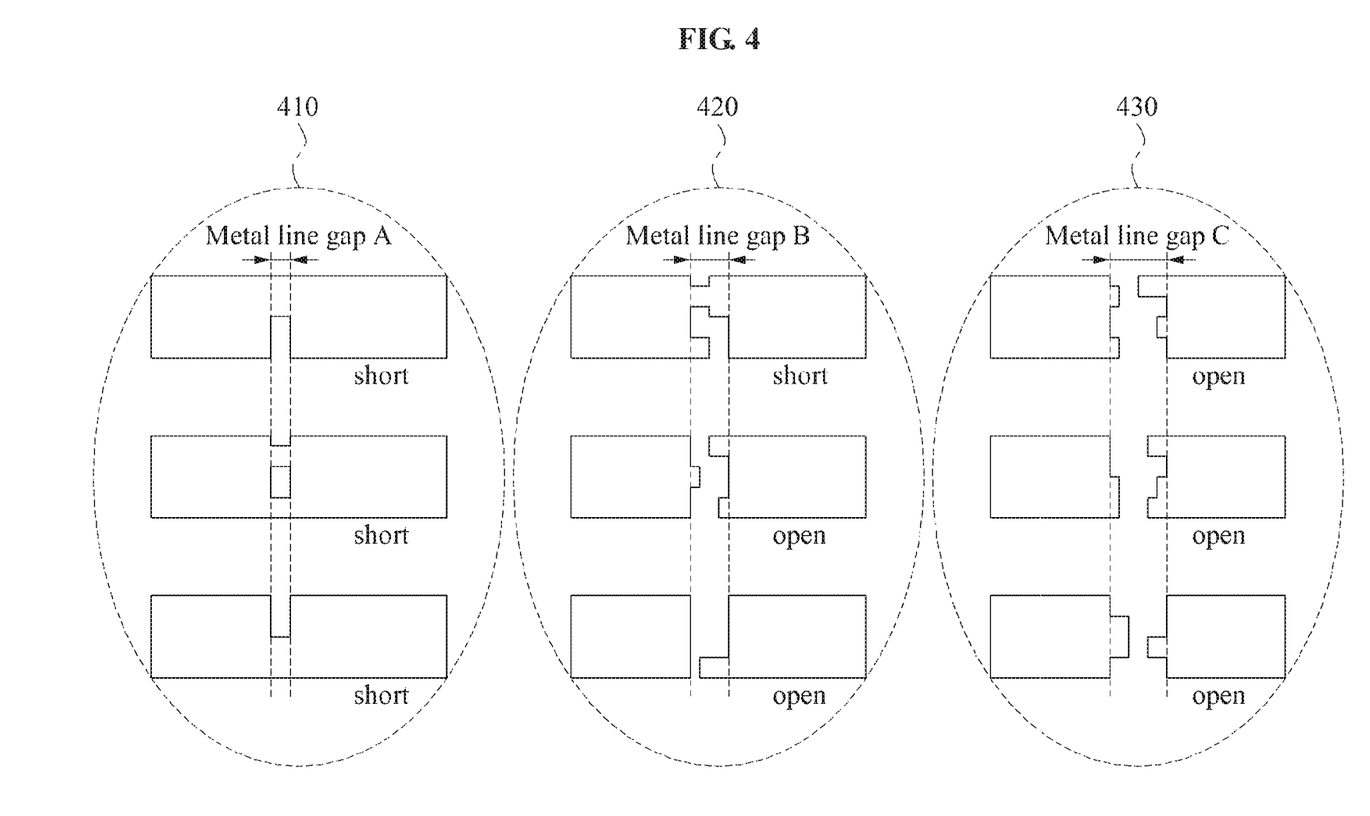
FIG. 4 is a diagram describing a configuration of an identification key generator according to an exemplary embodiment.

FIG. 4 is a diagram describing a configuration of an identification key generator according to an embodiment of the present invention.

According to another embodiment of the present invention, whether a short occurs between metal lines may be probabilistically determined by adjusting a spacing between the metal lines.

In a group 410 where a spacing between metal lines may be set to be relatively narrow to guarantee or increase the probability of a short between the metal lines, a short may occur between the metal lines in all cases.

In a group 430 where a spacing between the metal lines may be set to be relatively large, a short may not occur between the metal lines in all cases.

Similar to a group 420, the identification key generator 110 may set a spacing where a probability that a short occurs between the metal lines is such that part of the metal lines may be shorted and the other part of the metal lines may not be shorted.

Figure 5:
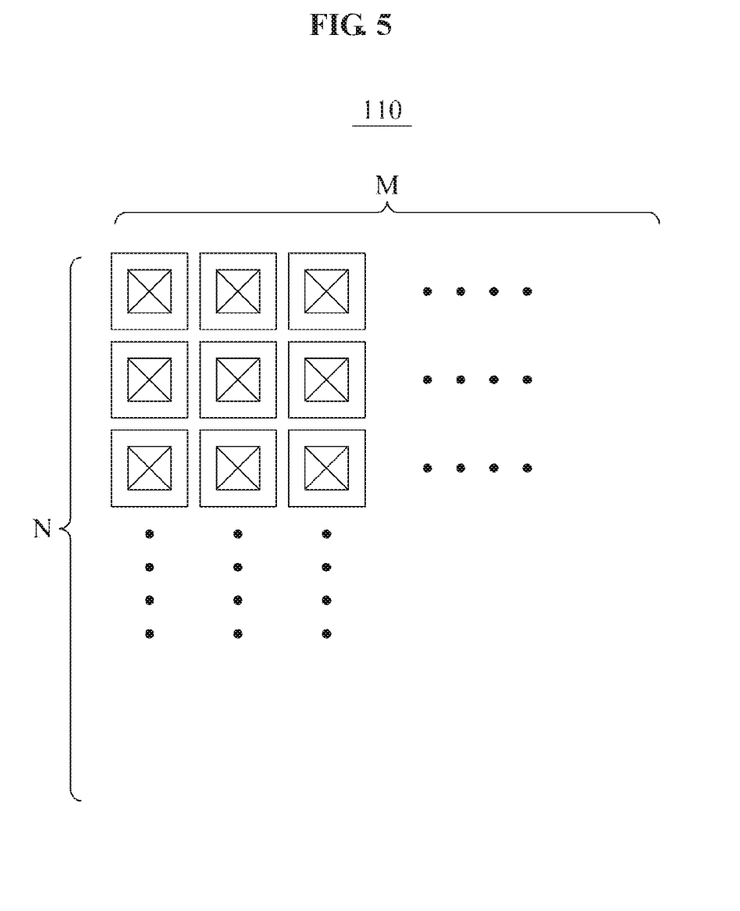
FIG. 5 is a diagram illustrating a contact array or a via array that may enable generating an identification key by an identification key generator according to an exemplary embodiment.

FIG. 5 is a diagram illustrating a contact array or a via array that may be formed on a semiconductor layer in order to generate an identification key by the identification key generator 110 according to an exemplary embodiment.

In FIG. 5, a configuration of vias formed between metal layers that may be layered on a semiconductor substrate is illustrated, including M vias in width (or a horizontal alignment) and N vias in length (or a vertical alignment), that is, M×N vias in total, M and N being natural numbers.

The identification key generator 110 may generate a M×N-bit identification key based on whether each of the M×N vias either shorts the metal layers (a digital value of 0), or fails to short the metal layers (a digital value of 1).

The generated M×N-bit identification key may be read by the identification key reader 120.

Figure 6:
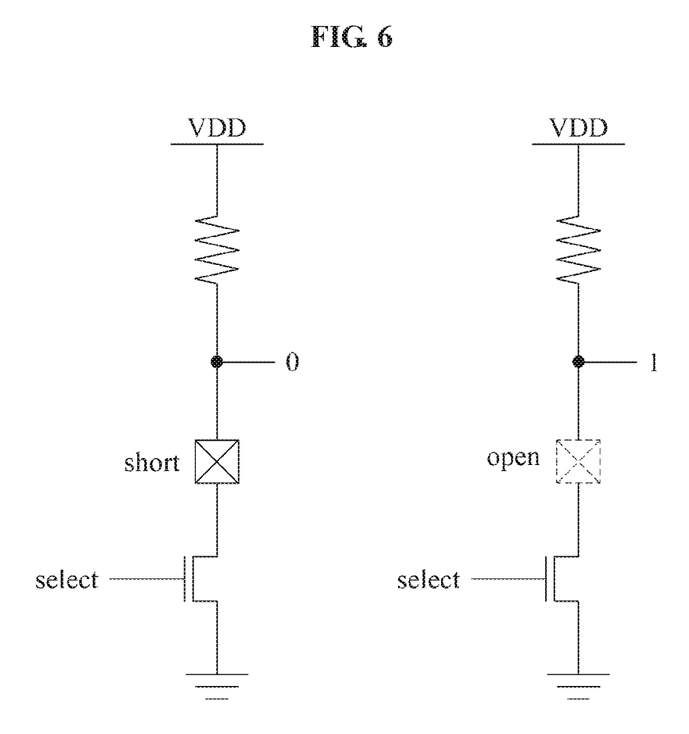
FIG. 6 is a diagram illustrating a configuration of an identification key generator that may generate an identification key using the contact array or the via array of FIG. 5 according to an exemplary embodiment.

FIG. 6 is a diagram illustrating a configuration of a circuit of the identification key generator 120 according to an exemplary embodiment.

The identification key generator 120 may identify digital logic values using a read transistor between a reference voltage VDD and a ground.

In an example of FIG. 6 including a pull-down circuit, when an individual via in the identification key generator 110 shorts metal layers, an output value may correspond to 0, and when an individual via fails to short metal layers, an output value may correspond to 1, and thus, the identification key generator 110 may generate an identification key. Although not described in greater detail, a description with respect to the pull-down circuit is extended to an example of a configuration including a pull-up circuit.

An identification key may be generated in a similar manner in an exemplary embodiment using a short between metal lines.

Although a single exemplary embodiment of a configuration of the identification key generator 120 of FIG. 6 is described, the present disclosure is not limited to the specific exemplary embodiment.

Thus, in the case of a configuration that may generate a digital value by determining whether a short occurs between metal layers or between metal lines in the identification key generator 110, various modifications and variations can be made without departing from the spirit of the disclosure or the scope of the disclosure.

The identification key generated by the identification key generator 110 may be transmitted to and stored in the identification key reader 120. The identification key reader 120 may correspond to a register or a flip-flop (not shown)

that may receive an input of the generated identification key, and may store the generated identification key.

In certain embodiments, the identification key reader 120 may correspond to the register or the flip-flop as well as other configurations analogous to the register or the flip-flop that may read and store the generated identification key.

Figure 7:
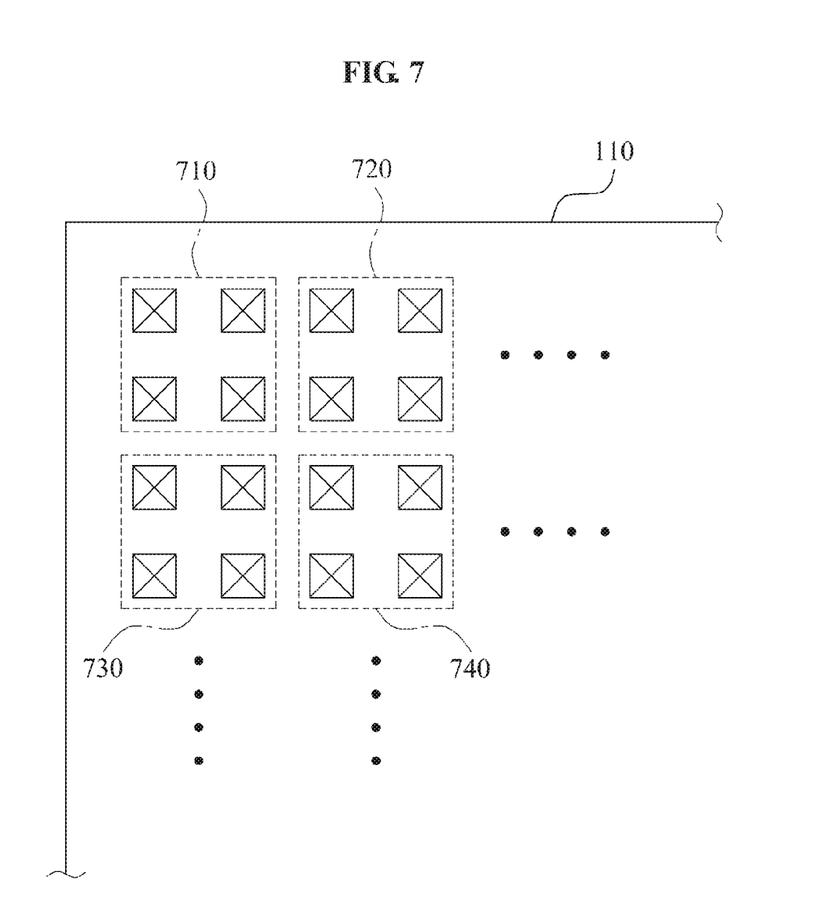
FIG. 7 is a diagram describing a process of processing an identification key by an identification key processing unit according to an exemplary embodiment.

FIG. 7 is a diagram describing a process of processing an identification key by an identification key processing unit according to an exemplary embodiment.

The identification key processing unit 130 may group M×N-bit digital values generated by the identification key generator 110 based on a predetermined number.

Although conceptual grouping of the digital values has been described with reference to FIG. 7, the present invention is not limited to the described exemplary embodiment. Those skilled in the art may appreciate that in certain embodiments, the identification key reader 120 including registers or flip-flops may group the registers or the flip-flops.

In FIG. 7, four digital values may be grouped into a single group.

The identification processing unit 130 may compare 4-bit digital values generated by each of a group 710 and a group 720. When the 4-bit digital value of the group 710 may be greater than the 4-bit digital value of the group 720, a digital value representing the group 710 and the group 720 may be determined to be 1.

Conversely, when the 4-bit digital value of the group 710 may be less than the 4-bit digital value of the group 720, the digital value representing the group 710 and the group 720 may be determined to be 0.

In certain embodiments, when the 4-bit digital value of the group 720 may be greater than the 4-bit digital value of the group 710, the representative digital value may be determined to be 1.

When the 4-bit digital value of the group 710 and the 4-bit digital value of the group 720 may be equal, the representative digital value either may be determined to be one of 1 and 0, or may be indeterminate.

Using this scheme, an identification key may be determined using the generated identification key by generating the representative digital value using the comparison of a group 730 and a group 740, and by the like.

The above description may be described as a process of processing the identification key to increase randomness of the identification key.

In the identification key generator 110, when a ratio of a short occurring (a digital value of 0), and a ratio of a short failing to occur (a digital value of 1) are different, a balancing between 0 and 1 may not be performed at times. Here, a probability that 1 is generated, and a probability that 0 is generated with respect to each bit may be different from 50%. However, since two groups may be equivalent, a probability that one of the two groups may have a digital value greater than the other of the two groups may correspond to 50%. Thus, a probabilistic balancing between 0 and 1 may be performed through the above-described process.

When the originally generated identification key corresponds to M×N bits, the identification key may be determined by the identification key processing unit 130 of FIG. 7 and may correspond to M×N/8 bits since a new 1-bit digital value may be determined using an 8-bit digital value.

The above description with respect to a process of grouping or a process of processing the identification key by the identification key processing unit 130 is not limited to an exemplary embodiment, and modifications to and variations of the process of processing the identification key for maintaining a balance between the digital value of 0 and the digital value of 1 can be made without departing from the spirit of the disclosure or the scope of the disclosure.

The new identification key that may be generated by the identification key generator 110 and determined by the identification key processing unit 130 may have randomness, and may become a reliable value that may, in theory, remain invariant once generated.

According to embodiments of the present invention, a reliable identification key having a characteristic of a random number that may be invariant according to time flow may be easily manufactured at relatively low manufacturing costs.

The random identification key may be generated during a semiconductor manufacturing process, and the identification key may be invariant after the manufacturing has been completed, and thus a process of externally inputting the identification key to a non-volatile memory, in a conventional scheme, may be unnecessary. Thus, a process of externally inputting and outputting the identification key may be absent, and even when a design drawing for a semiconductor chip is leaked, because the identification key may be generated based on a difference of physical characteristics during a manufacturing process, the identification key may be unclonable and provide considerably excellent security. Also, since the manufacturing process of the non-volatile memory may be unnecessary, manufacturing costs may be reduced.

Figure 8:
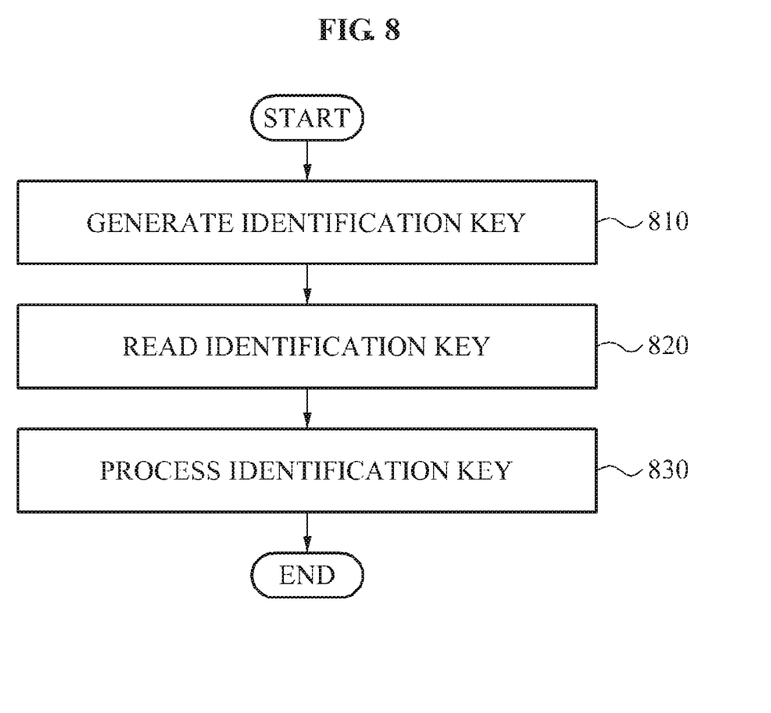
FIG. 8 is a diagram illustrating a method of generating an identification key according to an exemplary embodiment.

FIG. 8 is a diagram illustrating a method of generating an identification key according to an exemplary embodiment.

In operation 810, the identification key generator 110 may generate an identification key.

The identification key generator 110 may be configured to have randomness in whether a short occurs between nodes generated during a semiconductor manufacturing process. In addition, a characteristic of whether the short occurs between the nodes may be physically invariant and, accordingly, the identification key may be invariant once generated.

The identification key generator 110 may generate an identification key based on whether a short occurs between a contact or a via that may be formed between conductive layers generated during a semiconductor manufacturing process. Setting of a size of the contact or a size of the via is as described above with reference to FIG. 2 and FIG. 3.

The identification key generator 110 may adjust a spacing between conductive lines during a semiconductor manufacturing process so that part of the conductive lines shorts and the other part of the conductive lines fails to short, thereby generating an identification key having randomness. The embodiment is as described above with reference to FIGS. 4 through 6.

In operation 820, the identification key reader 120 may store the generated identification key using a register or a flip-flop. In generation of the identification key and reading of the identification key, whether the contact or the via shorts either conductive layers or conductive lines may be identified using a read transistor, which is as described above with reference to FIG. 6.

In operation 830, the identification key processing unit 130 may process the identification key generated by the identification key generator 110, and thus may guarantee randomness.

The process of processing the identification key is as described above with reference to FIG. 7.

The above-described exemplary embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present disclosure is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A semiconductor chip for generating an identification key, the chip comprising:
   an identification key generator circuit, including:
      a plurality of two layers; and
      a plurality of contacts or vias formed between the plurality of two layers, a hole size of at least one contact or via among the plurality of contacts or vias being
         greater than a hole size at which the contact or via never creates a short between the two layers, and
         less than a minimum hole size at which the contact or via always creates the short between the two layers,
      wherein the identification key generator circuit generates an identification key based on an electrical characteristic of a contact or via between two layers and wherein the electrical characteristic of the contact or via between the two layers remains invariant over any period of time; and
   an identification key reader circuit that reads the identification key by reading the electrical characteristic of the contact or via between the two layers constituting the identification key generator circuit.

2. The chip of claim 1, wherein the electrical characteristic of the contact or via is determined by whether the short or open occurs between the two layers.

3. The chip of claim 2, wherein
   the two layers constituting the identification key generator circuit correspond to conductive layers of a semiconductor, and
   the identification key generator circuit generates the identification key based on whether a contact or a via formed between the conductive layers of the semiconductor shorts the conductive layers.

4. The chip of claim 3, wherein the identification key reader circuit reads the identification key by reading whether the contact or the via shorts the conductive layers.

5. The chip of claim 3, wherein the hole size and the minimum hole size are based on a semiconductor manufacturing process.

6. The chip of claim 2, wherein the identification key generator circuit has N unit configurations to generate a 1-bit digital value using single contact or via connecting two layers, and thereby generates an N-bit identification key using the N unit configurations, N being a natural number.

7. The chip of claim 6, further comprising an identification key processing unit to process the identification key by receiving an input of an N-bit digital value read by an identification key reader circuit, by grouping N-bit digital values based on k bits, by comparing a first group and a second group among a plurality of the grouped groups, and by determining a digital value to be 1 when a value including k digital bits included in the first group is greater than a value including k digital bits included in the second group, the digital value representing the first group and the second group, and k being a natural number.

8. The chip of claim 7, wherein, when the value including the k digital bits included in the first group is equal to the value including the k digital bits included in the second group, the identification key processing unit determines the digital value representing the first group and the second group to be one of 1 and 0, or fails to determine the digital value representing the first group or the second group, selectively based on settings.

9. A semiconductor chip for generating an identification key, the chip comprising:
   an identification key generator circuit, including layers of a semiconductor, the layers having a spacing
      smaller than a spacing at which a short between the layers never occurs, and
      larger than a minimum spacing at which the short between the layers always occurs, wherein the identification key generator circuit generates an identification key based on an electrical characteristic between the layers and wherein the electrical characteristic between the layers remains invariant over any period of time; and
   an identification key reader circuit that reads the identification key by reading the electrical characteristic between the layers.

10. The chip of claim 9, wherein the electrical characteristic between the layers is determined by whether the short or an open occurs between the layers.

11. The chip of claim 10, wherein the identification key generator circuit has N pairs of layers having the same spacing, wherein each of the N pairs of the layers generates a 1-bit digital value based on whether a short occurs between the layers, and thus, generates an N-bit identification key, N being a natural number.

12. The chip of claim 11, further comprising an identification key processing unit to process the identification key by receiving an input of the N-bit digital value read by an identification key reader circuit, by grouping N-bit digital values based on k units, by comparing a first group and a second group among a plurality of the grouped groups, and by determining a digital value to be 1 when a value including k digital bits included in the first group is greater than a value including k digital bits included in the second group, the digital value representing the first group and the second group, and k being a natural number.

13. The chip of claim 12, wherein, when the value including the k digital bits included in the first group is equal to the value including the k digital bits included in the second group, the identification key processing unit determines the digital value representing the first group and the second group to be one of 1 and 0, or fails to determine the digital value representing the first group or the second group, selectively based on settings.

14. A method of generating an identification key, the method comprising:
generating an identification key based on an electrical characteristic of a contact or via between two layers constituting a circuit, the circuit including a plurality of contacts or vias formed between a plurality of two layers and a hole size of a contact or via among the plurality of contacts or vias being
greater than a hole size at which the contact or via does not create the short, and
smaller than a minimum hole size at which the contact or via creates the short, wherein the electrical characteristic of the contact or via between the two layers remains invariant over any period of time; and
reading the identification key by reading whether the electrical characteristic of the contact or via between the two layers constituting the circuit.

15. The method of claim 14, wherein the electrical characteristic of the contact or via is determined by whether the short or open occurs between the two layers.

16. The method of claim 15, wherein the two layers constituting the circuit correspond to conductive layers of a semiconductor, and the generating of the identification key generates the identification key based on whether the contact or via formed between the conductive layers of the semiconductor shorts the conductive layers.

17. The method of claim 16, wherein the reading of the identification key comprises reading whether the contact or via shorts the conductive layers.

18. The method of claim 16, wherein the first hole size and the second hole size are selected based on a semiconductor manufacturing process.

19. The method of claim 15, wherein the generating of the identification key uses N unit configurations to generate a 1-bit digital value using a single contact or via to connect a single pair of conductive layers, and generates an N-bit identification key using the N unit configurations, N being a natural number.

20. The method of claim 19, further comprising processing an identification key to process the identification key by receiving an input of an N-bit digital value read in the reading of the identification key, by grouping N-bit digital values based on k units, by comparing a first group and a second group among a plurality of the grouped groups, and by determining a digital value to be 1 when a value including k digital bits included in the first group is greater than a value including k digital bits included in the second group, the digital value representing the first group and the second group, and k being a natural number.

* * * * *

UNITED STATES PATENT AND TRADEMARK OFFICE
CERTIFICATE OF CORRECTION

Page 1 of 1

PATENT NO. : 10,769,309 B2
APPLICATION NO. : 16/266168
DATED : September 8, 2020
INVENTOR(S) : Byong Deok Choi et al.

It is certified that error appears in the above-identified patent and that said Letters Patent is hereby corrected as shown below:

On the Title Page

Item (73) Assignee, change "ICTK HOLDINGS CO., LTD" to --ICTK HOLDINGS CO., LTD.--.

Signed and Sealed this
First Day of June, 2021

Drew Hirshfeld
*Performing the Functions and Duties of the
Under Secretary of Commerce for Intellectual Property and
Director of the United States Patent and Trademark Office*